United States Patent [19]

Hayes et al.

[11] Patent Number: 5,703,631
[45] Date of Patent: Dec. 30, 1997

[54] METHOD OF FORMING AN ORIFICE ARRAY FOR A HIGH DENSITY INK JET PRINTHEAD

[75] Inventors: Donald J. Hayes; W. Royall Cox, both of Plano, Tex.

[73] Assignee: Compaq Computer Corporation, Houston, Tex.

[21] Appl. No.: 878,463

[22] Filed: May 5, 1992

[51] Int. Cl.⁶ .............................. B41J 2/14; B23K 26/00
[52] U.S. Cl. ................... 347/47; 29/890.1; 219/121.71
[58] Field of Search ........................... 346/1.1, 140 R; 29/890.1, 890.01; 347/20, 47; 219/121.71, 121.7, 121.69, 121.85

[56] References Cited

U.S. PATENT DOCUMENTS

| | | | |
|---|---|---|---|
| 4,430,784 | 2/1984 | Brooks et al. | 29/157 C |
| 4,658,269 | 4/1987 | Rezanka | 346/75 |
| 4,680,859 | 7/1987 | Johnson | 29/611 |
| 4,716,423 | 12/1987 | Chan et al. | 346/140 R |
| 4,733,447 | 3/1988 | Ageishi | 29/157 C |
| 4,789,425 | 12/1988 | Drake et al. | 156/644 |
| 4,820,897 | 4/1989 | Lefevre | 219/121.67 |
| 4,922,265 | 5/1990 | Pan | 346/1.1 |
| 4,932,112 | 6/1990 | Tikkanen | 29/163.8 |
| 5,016,024 | 5/1991 | Lam et al. | 346/1.1 |
| 5,072,240 | 12/1991 | Miyazawa et al. | 346/140 R |
| 5,093,548 | 3/1992 | Schmidt-Hebbel | 218/121.71 |
| 5,208,980 | 5/1993 | Hayes | 29/890.1 |
| 5,229,785 | 7/1993 | Leban | 346/1.1 |
| 5,263,250 | 11/1993 | Nishiwaki et al. | 29/890.1 |

FOREIGN PATENT DOCUMENTS

| | | |
|---|---|---|
| A 0 309 146 | of 0000 | European Pat. Off. . |
| A 0 367 541 | of 0000 | European Pat. Off. . |
| A 62 124 955 | of 0000 | Japan . |
| A 60 125 674 | of 0000 | Japan . |
| A 58 063 466 | of 0000 | Japan . |
| A 04 022 644 | of 0000 | Japan . |
| 56-113470 | 9/1981 | Japan . |
| 57-182449 | 11/1982 | Japan . |
| 60-54858 | 3/1985 | Japan . |
| A 2 011 645 | of 0000 | United Kingdom . |

OTHER PUBLICATIONS

IBM Technical Disclosure Bulletin, vol. 26, No. 3A, Aug. 1983.
Hiraska, H. and Lazare, S., "Ehcimer laser photoablation of telon AF, with the aid of a new design and developing technique," CLEO '91 (pp. 508–509).
Patent Abstracts of Japan, vol. 9, No. 282, Nov. 1985.
Patent Abstracts of Japan, vol. 7, No. 157, Jul. 1983.
Patent Abstract of Japan, vol. 16, No. 184, May 1992.
Patent Abstracts of Japan, vol. 11, No. 344, Nov. 1987.
IBM Technical Disclosure Bulletin, vol. 17, No. 5, Oct. 1974.
IBM Technical Disclosure Bulletin, vol. 22, No. Patent Abstracts of Japan, vol. 16, No. 184, May 1992.

*Primary Examiner*—Mark J. Reinhart
*Assistant Examiner*—Craig A. Hallacher
*Attorney, Agent, or Firm*—Vinson & Elkins L.L.P.

[57] ABSTRACT

Method of forming an orifice array for an ink jet printhead. Excimer laser radiation is used to ablate an orifice array in a cover plate having a removable backing, a front side layer formed from either an ablatable inactive material such as polyimide, a non-wettable material doped to absorb excimer radiation, or an ablatable inactive material such as polyimide with a very thin surface layer of a non-wettable material, and an intermediate layer formed from an adhesive material. First, a series of generally square indentations approximately 80 μm on each side and which extends through the removable backing and the intermediate layer and partially through the front side layer to exposing an interior surface of the front side are formed at spaced locations along the back side surface of the cover plate. Next, a corresponding series of generally circular apertures approximately 40 μm in diameter, each positioned in the general center of the corresponding indentation and extending through the front side layer are formed in the cover plate.

31 Claims, 3 Drawing Sheets

METHOD OF FORMING AN ORIFICE ARRAY FOR A HIGH DENSITY INK JET PRINTHEAD

BACKGROUND OF THE INVENTION

1. Field of the Invention

The invention relates to a method of forming an orifice array for a high density ink jet printhead and, more particularly, to a method of forming an orifice array for an ink jet printhead using a two-step laser ablation technique.

2. Description of Related Art

A popular form of non-impact printing is generally referred to as ink jet printing. Ink jet printing systems use the ejection of tiny droplets of ink to produce an image. The devices produce highly reproducible and controllable droplets, so that a droplet may be printed at a location specified by digitally stored image data. Most ink jet printing systems commercially available may be generally classified as either a "continuous jet" type ink jet printing system where droplets are continuously ejected from the printhead and either directed to or away from the paper depending on the desired image to be produced or as a "drop on demand" type ink jet printing system where droplets are ejected from the printhead in response to a specific command related to the image to be produced.

Continuous jet type ink jet printing systems are based upon the phenomena of uniform droplet formation from a stream of liquid issuing from an orifice. It had been previously observed that fluid ejected under pressure from an orifice about 50 to 80 microns in diameter tends to break up into uniform droplets upon the amplification of capillary waves induced onto the jet, for example, by an electromechanical device that causes pressure oscillations to propagate through the fluid. In this manner, ink is forced through the orifice where it forms a droplet. The droplet is electrostatically charged and then attracted towards an oppositely charged platen located behind a sheet paper. Using electrically controlled deflection plates similar to those in a CRT, the trajectory of the droplet can be controlled to hit a desired spot on the paper. Unused drops are deflected away from the paper into a reservoir for recycling of the ink. Due to the small size of the droplet and the precise trajectory control, ink jet printing quality can approach that of formed-character impact printing. One drawback to continuous jet type ink jet printing systems is that fluid must be jetting even when little or no printing is required. This requirement degrades the ink and decreases reliability of the printing system.

Due to this drawback, there has been increased interest in the production of droplets by electromechanically induced pressure waves. In this type of system, a volumetric change in the fluid is induced by the application of a voltage pulse to a piezoelectric material which is directly or indirectly coupled to the fluid. This volumetric change causes pressure/velocity transients to occur in the fluid and these are directed so as to produce a droplet that issues from an orifice. Since the voltage is applied only when a droplet is desired, these types of ink jet printing systems are referred to as "drop-on-demand" type systems.

Most drop-on-demand type ink jet printheads include a body portion having a plurality of ink-carrying channels formed therein from which droplets of ink are ejected. Many of such ink jet printheads also include a cover plate fixedly mounted on the front end of the body portion. Extending through the cover plate would be a plurality of orifices which comprise the orifice array for the ink jet printhead. In most ink jet printheads, each orifice in the orifice array corresponds to one of the channels extending through the body portion. The cover plate is positioned on the front end of the body portion such than each orifice is in communication with the corresponding channel. When a pressure wave is created in a channel, the ink droplet is forcedly ejected from the ink jet printhead through the orifice in communication with that channel.

In order to form an orifice array for an ink jet printhead, it was common to take the unattached cover plate and to drill a series of orifices therethrough, for example, utilizing conventional laser drilling techniques. Once drilling of the orifices was completed, a coating of an adhesive material, for example, epoxy, was placed on the back surface of the cover and/or the front end of the main body of the ink jet printhead. The cover would then be aligned with the front end of the main body so that each orifice was located in front of and in communication with a corresponding channel extending through the main body of the ink jet printhead. After alignment of the cover plate and main body was completed, the cover would then be bonded to the front end of the main body of the ink jet printhead.

A significant problem in manufacturing ink jet printheads in this manner was that the adhesive typically used to bond the back side of the cover plate to the front end of the main body of the ink jet printhead tends to clog or partially block the orifices formed in the cover plate. This problem has become of particular concern in view of the increasing popularity of higher density ink jet printheads, i.e. ink jet printheads having a channel array where adjacent channels are spaced between approximately four and eight mils apart. In such high density ink jet printheads, the likelihood that the cover plate could be mounted on the main body of the ink jet printhead without having the adhesive clogging or partially blocking at least one of the orifices formed in the cover plate has become increasingly more unlikely. This problem has significantly complicated present methods for manufacturing ink jet printheads.

Another problem in manufacturing ink jet printheads using conventional laser drilling techniques is that, due to the convergence effects of an excimer laser beam, the width of orifices formed thereby tends to decrease as the laser extends deeper into the cover plate. As a result, orifices formed in this manner tend to taper from the entrance to exit sides of the cover plate. As a tapered orifice will affect the velocity and direction of a fluid passing therethrough, the velocity and direction of ink ejected by an ink jet printhead may be adversely affected by the taper of the orifice.

Still another problem in manufacturing ink jet printheads using conventional laser drilling techniques is the inability of such techniques to precisely control the shape and edge conditions of an orifice formed along the exit or ink-ejecting side of the cover plate. Prior to ablating an orifice in a cover plate, the cover plate must first be fixedly mounted on a support surface. Most commonly, the support surface has a number of air-drawing apertures, also known as "vacuum chucks", formed therein. By positioning the cover plate over the apertures, the suction provided thereby fixedly supports the cover plate on the support structure. However, when the laser "punches" through the ink-ejecting side of the cover plate, the laser will also partially ablate the support surface, thereby resulting in the release of gaseous byproducts. Such byproducts tend to roughen the edges and alter the size and shape of the orifices being formed, thereby adversely affecting ink jet performance. This problem can be circumvented by locating the orifices over the apertures in the support surface. However, the resultant reduction in support during the ablation process can result in flaps of unablated material being left at the edges of an orifice. Like the aforementioned roughened edges, this too can adversely impact ink jet performance.

SUMMARY OF THE INVENTION

In one embodiment, the present invention is a method of forming an orifice in a cover plate for an ink jet printhead. An indentation is formed in a cover plate having a removable backing, a front side layer formed from an ablatable inactive material, and an intermediate layer formed from an adhesive material. The indentation extends through the removable backing and the intermediate layer and partially through the front side layer, thereby exposing an interior surface of the front side layer. An aperture extending from a portion of the exposed interior surface and through the front side layer is then formed in the cover plate. In one aspect of this embodiment of the invention, the indentation is formed in a generally rectangular shape, preferably a square approximately 80 μm along each side and, in another aspect, the aperture is formed in a generally circular shape, preferably 40 μm in diameter and positioned in the general center of the square indentation. In alternate aspects of the invention, the front side layer is formed of polyimide, a non-wettable material doped to absorb excimer radiation, or polyimide with a thin layer of a non-wettable material and, in yet another aspect of the invention, the indentation and aperture are formed by ablating the cover plate using excimer laser radiation.

In one aspect of the invention, a support structure having a support surface formed from an ablatable material is provided and the cover plate is supported on the support surface before forming the aperture therein. The support structure may include a base support having an aperture of specified diameter formed therein. An aperture having a diameter less than the specified diameter is then formed in the support layer and the support layer positioned on the base support such that the apertures are in communication with each other. Air is then drawn through the base support aperture to secure the support layer on the base support. The cover plate is then positioned on the support layer such that air drawn through the support layer aperture secures the cover plate on the support layer. The indentation and aperture may then be formed in the cover plate at a location positioned above the ablatable material of the support layer.

In another embodiment, the present invention is a method of forming an orifice array in a cover plate for an ink jet printhead. A series of indentations are formed at spaced locations along a back surface of the cover plate to expose an interior surface of the cover plate. An aperture extending from the exposed interior surface to a front surface of the cover plate is then formed in each of the series of indentations. In one aspect of this embodiment, each indentations is formed in a generally rectangular shape, preferably a square 80 μm along a side, and, in another aspect of this embodiment of the invention, each aperture is formed in a generally circular shape, preferably in the general center of the corresponding indentation and having a diameter of approximately 40 μm.

In yet another embodiment, the present invention is a method of forming an ink jet printhead. First, a main body portion having a front end and at least one ink-carrying channel axially extending through the main body portion and in communication with the front end and a cover plate having front and back surfaces are provided. A corresponding number of ink-ejecting orifices, each having an indentation at the back surface, are then formed in the cover plate. The cover plate is then mounted to the main body portion such that each of the at least one ink-carrying channel is in communication with the corresponding ink-ejecting orifice. In one aspect of this embodiment, each orifice is formed by forming an indentation in the back surface of the cover plate to expose an interior surface. Then, an aperture which extends from a portion of the exposed interior surface to the front surface of the cover plate is formed. In another aspect, a layer of adhesive is provided on the back side of the cover plate and a thermal bond between the layer of adhesive and the front end of the main body portion is formed to mount the cover plate to the main body portion. Excess adhesive produced during the formation of the thermal bond is collected by the indentation before the adhesive can flow into the orifice and clog it.

BRIEF DESCRIPTION OF THE DRAWINGS

The present invention may be better understood, and its numerous objects, features and advantages will become apparent to those skilled in the art by reference to the accompanying drawing, in which.

DETAILED DESCRIPTION OF A PREFERRED EMBODIMENT

Figure 1A:
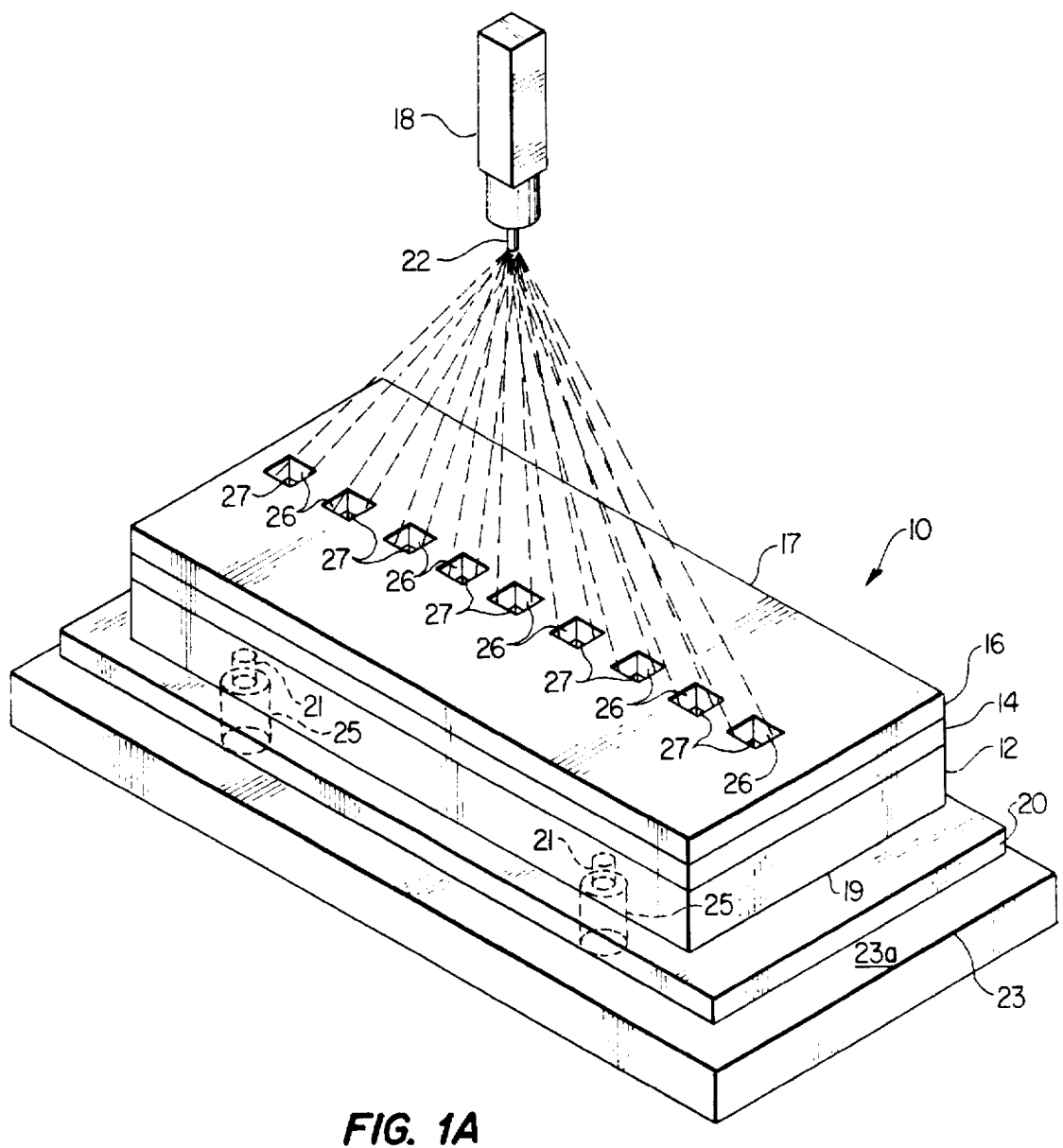
FIG. 1a is a perspective view of a first ablating step used to form an orifice array constructed in accordance with the teachings of the present invention.

Referring first to FIG. 1a, a method for forming an orifice array for an ink jet printhead in accordance with the teachings of the present invention shall now be described in greater detail. A cover plate 10 for an ink jet printhead is comprised of a layer 12 of an ablatable inactive material, for example, polyimide or an ablatable non-wettable material doped to absorb excimer radiation, bonded to a layer of an adhesive material 14, for example, a thermal set adhesive such as an epoxy, which, in turn, is covered by a removable backing sheet 16. The cover plate 10 may be formed by properly dimensioning a commercially available sheet of material, for example, the type CMD901750 polyimide/ adhesive laminated sheet manufactured by Rogers Corporation which consists of a 0.001 inch thick layer of Kapton polyimide, a 0.0006 inch thick layer of thermal-set adhesive and a 0.001 inch thick removable backing sheet. It should be noted, however, that other, differently configured cover plates are suitable for use herein. For example, it is contemplated that a similarly dimensioned sheet of a nonwettable material doped, for example, using a perfluoro aromatic compound, such that it will absorb excimer radiation would also be suitable for use herein. It is further contemplated that a properly dimensioned sheet of polyimide having a very thin surface layer of a nonwettable material between 0.1 and 5 microns thick formed thereon would be suitable for use in place of the layer 12.

Before forming an orifice array in the cover plate 10, the cover plate 10 is securably mounted to a support structure which includes a base support structure 23 and a support layer 20 of a highly ablatable material such as polyimide formed thereon. Vacuum means (not shown) draws air through air drawing apertures (or "vacuum chucks") 25 which extend through the base support structure and through corresponding apertures 21 which extend through the layer 20 and which are in communication with the apertures 25. To form the support structure, a series of apertures 21 having diameters less than the diameters of the apertures 25 and positioned at locations corresponding to the locations of the apertures 25 of the base support structure 23 are formed in the support layer 20. In the embodiment of the invention illustrated in FIGS. 1a–b, it is contemplated that a pair of apertures 25 and a corresponding pair of apertures 21 are provided on both sides of the locations where orifices are to be formed. It is contemplated, however, that various numbers of apertures 25 and corresponding apertures 21 would be suitable for use herein. The support layer 20 is then placed onto the top surface 23a of the base support structure 23 such that suction provided by air drawn through the apertures 25 secures the support layer 20 thereto. The layer 12 is then positioned on the top surface 20a of the support layer 20 such that air drawn through the apertures 21 holds the layer 12 in place.

Figure 1B:
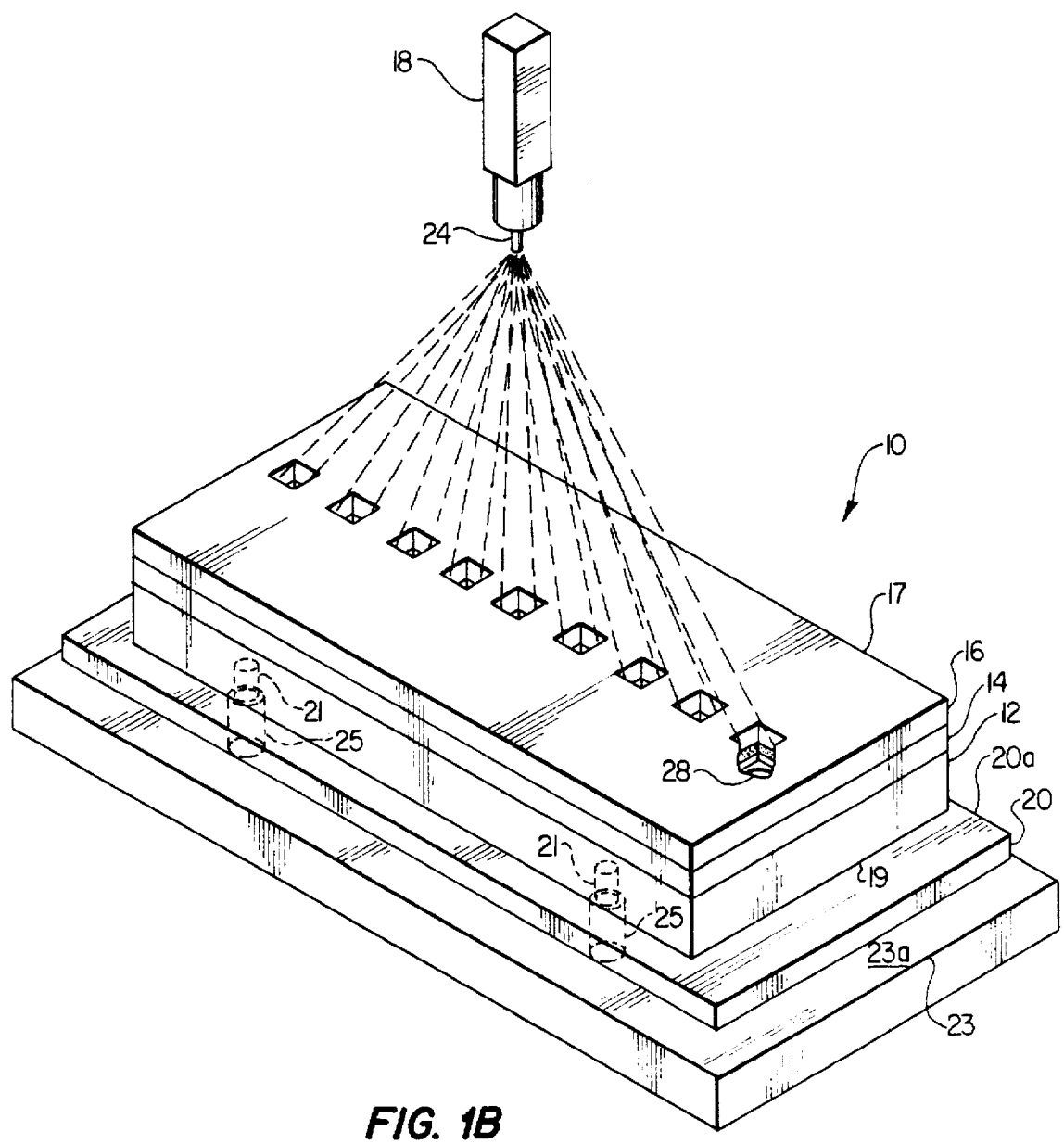
FIG. 1b is a partially cut away perspective view of a second ablating step used to form an orifice array constructed in accordance with the teachings of the present invention.

In order to form an orifice array in the desired configuration, an excimer laser 18 positioned above the cover plate 10 by mounting means (not shown), generates ultraviolet (or "UV") radiation capable of photoablating the cover plate 10. The UV radiation passes through a first mask 22 which, in the embodiment of the invention illustrated in FIGS. 1a–b is shown mounted to the end of the laser 18. The mask 22 modifies the UV radiation passing therethrough so that the radiation exiting therefrom, will ablate material forming the cover plate 10 in a desired shape at a series of spaced locations along a back side surface 17 of the cover plate 10. The mask 22 may be comprised of a thin sheet of metal having a series of apertures (not shown) formed in an array which patterns the desired shapes and locations of indentations to be formed at the site of each orifice of the orifice array to be formed. Alternately, the mask 22 may be comprised of a sheet of glass having a thin film formed thereon which covers the entire sheet with the exception of particular locations which pattern the desired shapes and locations of the indentations. UV radiation emerges from the first mask 22 as a series of beams, each having a generally rectangular cross-section, and ablates material forming the cover plate 10 at the series of spaced locations to expose a generally rectangular interior surface 27 having selected dimensions of the layer 12 of inactive material, thereby forming indentations 26, each of which is formed at the site of an orifice, generally rectangular in shape and extends through the removable backing sheet 16, the layer 14 of adhesive material, part of the layer 12 of inactive material and terminates at the interior surface 27.

Referring next to FIG. 1b, after the indentations 26 are formed in the cover plate 10, the first mask 22 is removed and a second mask 24 is installed. The excimer laser 18 again generates UV radiation which now passes through the second mask 24. The second mask 24 directs the UV radiation to the same locations on the cover plate 10 but in beams having a generally circular, rather than rectangular, cross-section. As a result, the UV radiation striking the cover plate 10 at the specified locations pass through the indentations 26 and strike a portion of the interior surface 27 to ablate additional material which forms the layer 12 of inactive material, thereby providing a series of orifices 28, each having an indentation in communication therewith. Each of the orifices 28 has a generally circular cross-section having a diameter less than the length of the generally rectangular interior surface 27 and extending from the interior surface 27 to the front side surface 19 of the cover plate 10. Preferably, the beams of UV radiation emerging from the second mask 24 are directed to strike in the general center of the generally rectangular interior surfaces 27 exposed in the first ablating step. As the beams ablate sufficient material such that they "punch" through the front side surface 19 of the layer 12, the edges of the orifices formed by the beam will be smooth, rather than rough or jagged, as the emerging beams will immediately begin to ablate the highly ablatable material forming the support layer 20.

Figure 2:
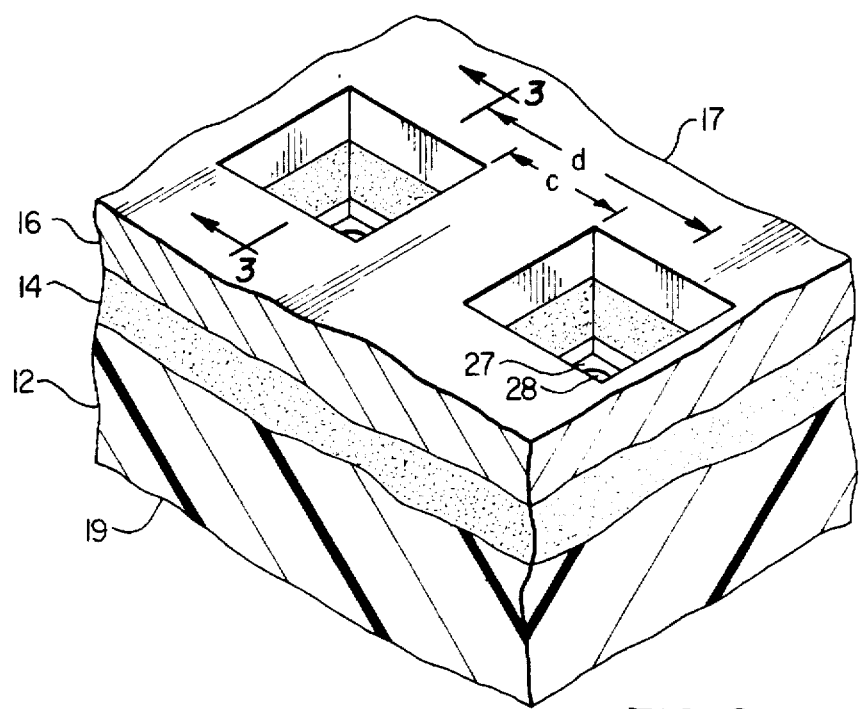
FIG. 2 is a cut away perspective view of a portion of a cover plate having an orifice array formed by the method illustrated in FIGS. 1a–b.
Figure 3:
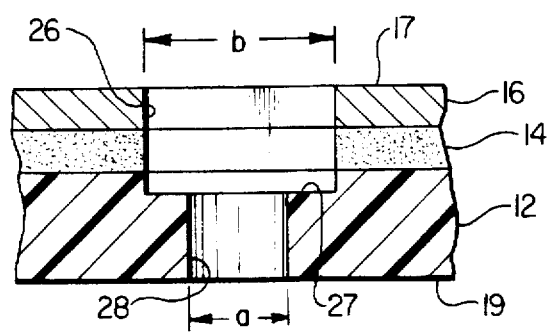
FIG. 3 is a cross-sectional view of the cover plate of FIG. 2 taken along lines 3—3.

Referring next to FIGS. 2 and 3, a fully formed orifice formed by the two step ablation technique described herein may now be seen. As previously noted, the fully formed orifice includes an indentation 26, each indentation 26 having a generally rectangular cross-section and which extends from the back side surface 17 of the cover plate 10, through the backing sheet 16 and the adhesive layer 14 and partially through the polyimide layer 12, and a orifice 28 having a generally circular cross-section 28 which extends from the end of the indentation 26 to the front side surface 19 of the cover plate 10. Preferably, the orifice 28 should have a diameter "a" of approximately 40 μm and the centers of adjacent orifices 28 should be approximately 173 μm apart. Each indentation 26 is preferably formed to have a generally square cross-section 80 μm±5 μm along each side and separated from an adjacent indentation 26 by 90 μm±5 μm.

Figure 4:
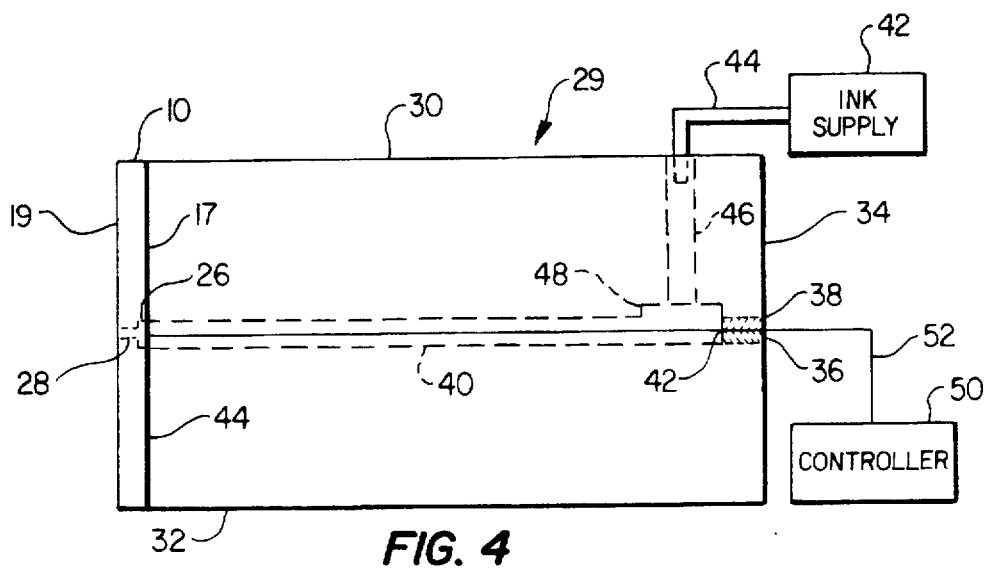
FIG. 4 is a side view of a fully assembled ink jet printhead constructed in accordance with the teachings of the present invention.

Referring next to FIG. 4, a side view of a fully assembled ink jet printhead 29 having a main body portion 30 and a cover plate 10 formed in accordance with the methods described herein may now be seen. The main body portion 30 of the ink jet printhead 29 illustrated herein includes a lower body portion 32 having a plurality of axially extending grooves formed therein and blocked, at one end, by composite material 36, and an upper body portion 34, also having a plurality of axially extending grooves formed therein and blocked, at the one end, by composite material 38. The lower and upper body portions 32, 34 are mounted together to define a plurality of ink carrying channels 40 axially extending therethrough, each of which extend from a first end 41 located within the main body portion 30 and terminate at an opening along a front side 43 thereof. Preferably, the ink carrying channels 40 should be generally parallel to each other along their entire length.

Ink is supplied to the ink-carrying channels 40 by an ink supply means 42 via an external conduit 44. Many methods for supplying ink from the ink supply means to the ink-carrying channels are known in the art and, therefore, need not be described in greater detail here. For example, the external conduit 44 may deliver the ink to a vertically orientated internal conduit 46 which, in turn, supplies the ink to a manifold 48 extending lengthwise in the interior of the main body portion 30. As the manifold 48 is in communication with each of the parallel ink-carrying channels 40, ink may be drawn from the manifold 48 and into the ink-carrying channels 40. A controller 50 which controls the actuation of the channels 40 is connected to the main body portion 30 by line 52.

Notwithstanding the specific configuration of the ink jet printhead 29 described and illustrated herein, it should be fully understood that the methods described herein are readily applicable to numerous other ink jet printhead configurations. Specifically, it is contemplated that the present invention may be used in combination with those configurations of ink jet printheads where the main body portion 30 is formed of a single piece of material, either active or inactive, or formed of any number of components, again, either active or inactive, bonded together to form the main body portion 30. It is further contemplated that the present invention may be used to form a single orifice in an ink jet printhead having a single ink-carrying channel axially extending therethrough or an array of orifices in an ink jet printhead having multiple ink-carrying channels.

To mount the cover plate 10 having an array of orifices 28 formed in accordance with the method described above, the removable backing sheet 16 is peeled off of the cover plate 10, thereby exposing the layer 14 of adhesive material. The orifices 28 in the cover plate 10 are aligned with the corresponding ink carrying channels 40 of the main body portion 30 and the layer 14 of adhesive is then pressed, in the presence of heat, against the front side 43 of the main body portion 30 to thermally bond the cover plate 10 to the main body portion 30. Excess adhesive displaced from the layer 14 during the thermal bonding of the cover plate 10 to the main body portion 30 flows harmlessly into the indentations 26 instead of entering the orifices 28. Thus, by forming an indentation 26 at the site of each orifice 28, the prior art problem of clogging of the orifices 28 or ink carrying channels 40 by excess adhesive material during the mounting process is avoided.

Preferably, each orifice 28 should be positioned such that it is located at the center of the end of the corresponding channel 40, thereby providing ink ejection nozzles for the channels 40. It is contemplated that the dimensions of the array of orifices 28 could be varied to cover various selected lengths along the cover plate 10, depending on the channel requirements of the particular ink jet printhead 29 envisioned. For example, the array of orifices 28 may extend about 0.193 inches along the cover plate 10 and be comprised of about twenty-eight orifices in a single row.

Yet another benefit achieved by forming an orifice or orifices in the cover plate 10 in accordance with the methods disclosed herein is that the taper of the orifices is reduced in comparison with traditional ablation techniques. As previously discussed, conventional ablation techniques tend to form apertures which decrease in diameter as they extend through the material. As a result, orifices formed by such techniques are often characterized by a slight taper. In the method of forming an orifice disclosed herein, the orifice 28 extends through only a portion of the layer 12 of ablatable material, the remainder of the layer 12 being used to form the indentation 26. By reducing the thickness of the portion of the layer 12 used to form the orifice, orifice taper is minimized.

Thus, there has been described and illustrated herein a method for forming orifices in a cover plate for an ink jet printhead which minimizes the taper of the orifices formed thereby, reduces the likelihood that excess adhesive material will clog the orifices when the cover plate is mounted to a main body portion of the ink jet printhead, and prevents damage to the orifice edges during the ablation process. However, those skilled in the art will recognize that many modifications and variations besides those specifically mentioned may be made in the techniques described herein without departing substantially from the concept of the present invention. Accordingly, it should be clearly understood that the form of the invention described herein is exemplary only and is not intended as a limitation on the scope of the invention.

What is claimed is:

1. A method of forming an orifice in a cover plate for an ink jet printhead, comprising the steps of:

providing a cover plate having a removable backing, a front side layer formed from an ablatable inactive material having a front surface, and an intermediate layer formed from an adhesive material;

forming an indentation in said cover plate, said indentation extending through said removable backing and said intermediate layer and partially through said front side layer, said indentation exposing an interior surface of said front side layer; and forming an aperture in said cover plate, said aperture having a smaller cross-sectional area than said indentation and extending from a portion of said exposed interior surface of said from side layer to said front surface of said front side layer, whereby said removable backing is removed and said intermediate layer is provided to adhere said front side layer to the ink jet printhead without said adhesive material clogging said aperture.

2. A method according to claim 1 wherein said indentation is formed in a generally rectangular shape.

3. A method according to claim 2 wherein said aperture is formed in a generally circular shape.

4. A method according to claim 3 wherein said generally circular aperture is formed in the general center of said generally rectangular indentation.

5. A method according to claim 4 wherein said generally circular aperture is formed having a diameter of approximately 40 µm and said generally rectangular indentation is a square approximately 80 µm along each side.

6. A method according to claim 1 wherein the steps of forming an indentation and an aperture in said cover plate further comprises the step of ablating said cover plate using excimer laser radiation.

7. A method according to claim 6 wherein said front side layer of said cover plate is formed of polyimide.

8. A method according to claim 6 and further comprising the steps of:

providing a support structure having a support surface formed from an ablatable material; and supporting said cover plate on said support surface of said support structure before forming said indentation in said cover plate.

9. A method according to claim 8 wherein the step of providing a support structure having a support surface formed from an ablatable material further comprises the steps of:

providing a base support having an aperture with a specified diameter formed therein;

providing a support layer formed from an ablatable material;

forming at least one aperture in said support layer having a diameter less than said specified diameter;

positioning said support layer on said base support such that said apertures are in communication with one another;

drawing air through said aperture to secure said support layer on said base support; and positioning said cover plate on said support layer such that air drawn through said support layer aperture secures said cover plate on said support layer.

10. A method according to claim 9 wherein the steps of forming an indentation and aperture in said cover plate further comprises the steps of forming said indentation and aperture at a location positioned above said ablatable material of said support layer.

11. A method according to claim 10 wherein said support layer is formed of polyimide.

12. A method according to claim 1 wherein said front side layer of said cover plate is formed from a non-wettable material doped to absorb excimer radiation.

13. A method according to claim 1 wherein said cover plate includes a removable backing, a front side layer formed from an ablatable inactive material, and an intermediate layer formed from an adhesive material and wherein the step of forming a series of indentations at spaced locations along said back surface of said cover plate to expose an interior surface of said cover plate further comprises the step of ablating said removable backing, said intermediate layer and part of said front side layer at said spaced locations using excimer laser radiation.

14. A method according to claim 13 wherein the step of forming an orifice in said cover plate further comprises the step of ablating, using excimer laser radiation, said front side layer at each of said spaced locations.

15. A method according to claim 14 wherein said front side layer of said cover plate is formed of polyimide.

16. A method according to claim 14 wherein said front side layer of said cover plate is formed from a non-wettable material doped to absorb excimer radiation.

17. A method according to claim 14 and further comprising the steps of:

providing a support structure having a support surface formed from an ablatable material; and supporting said cover plate on said support surface of said support structure before forming said indentations in said cover plate.

18. A method according to claim 17 wherein the step of providing a support structure having a support surface formed from an ablatable material further comprises the steps of:

providing a base support having an aperture with a specified diameter formed therein;

providing a support layer formed from an ablatable material;

forming at least one aperture in said support layer having a diameter less than said specified diameter;

positioning said support layer on said base support such that said apertures are in communication with one another;

drawing air through said aperture to secure said support layer on said base support; and positioning said cover plate on said support layer such that air drawn through said support layer aperture secures said cover plate on said support layer.

19. A method according to claim 18 wherein the steps of forming a series of indentations and a series of apertures in said cover plate further comprises the steps of forming said indentations and apertures at a series of locations positioned above said ablatable material of said support layer.

20. A method according to claim 19 wherein said support layer is formed of polyimide.

21. A method of forming an orifice in a cover plate for an ink jet printhead, said cover plate having a front surface and intersecured layer components comprising a removable backing, a front side layer formed from an ablatable material, and an intermediate layer formed from an adhesive material, comprising the steps of:

forming an indentation in said cover plate extending through said removable backing and said intermediate layer and partially into said front side layer, said indentation exposing an interior surface of said front side layer; and forming an aperture in said indentation, said aperture having a smaller cross-sectional area than said indentation and extending from a portion of said exposed interior surface of said front side layer to said front surface of said cover plate, whereby said removable backing is removed and said intermediate layer is provided to adhere said front side layer to the ink jet printhead without said adhesive material clogging said aperture.

22. A method according to claim 21 wherein said indentation is formed in a generally rectangular shape.

23. A method according to claim 22 wherein said aperture is formed in a generally circular shape.

24. A method according to claim 22 wherein said generally circular aperture is formed in the general center of said generally rectangular indentation.

25. A method according to claim 21 wherein the steps of forming an indentation and an aperture in said cover plate further comprises the step of ablating said cover plate using excimer laser radiation.

26. A method according to claim 25 wherein said excimer laser comprises an ultraviolet light filter.

27. A method according to claim 26 wherein said ultraviolet light filter further comprises a first ultraviolet filter for forming said indentation and a second ultraviolet light filter for forming said aperture.

28. A method of forming an ink jet printhead, comprising the steps of:

providing a main body portion having a front end and at least one ink-carrying channel axially extending through said main body portion and in communication with said front end;

providing a cover plate having front and back surfaces;

forming, in said cover plate, an ink-ejecting orifice corresponding to each of said at least one ink-carrying channel, said orifice comprising an indentation into said back surface, said indentation exposing an interior surface of said cover plate, and an aperture having a smaller cross-sectional area than said indentation, said aperture extending from a portion of said exposed interior surface to said front surface of said cover plate; and mounting said cover plate to said main body portion such that each of said at least one ink-carrying channel is in communication with said corresponding ink-ejecting orifice.

29. A method according to claim 28 and further comprising the steps of:

providing a layer of adhesive on said back side of said cover plate;

forming a thermal bond between said layer of adhesive and said front end of said main body portion to mount said cover plate to said main body portion;

said indentation collecting excess adhesive produced during said bonding step.

30. A method according to claim 29 wherein said cover plate further comprises a removable backing, a front side layer formed from an ablatable inactive material, and an intermediate layer formed from an adhesive material and wherein the step of mounting said cover plate to said front end of said main body portion further comprises the steps of:

removing said removable backing; and affixing said layer of adhesive to said front end of said main body portion.

31. A method according to claim 30 wherein the step of forming said orifice further comprises the steps of:

forming an indentation in said back surface of said cover plate, said indentation extending through said removable backing and said intermediate layer and partially through said front side layer, said indentation exposing an interior surface of said cover plate; and forming an aperture which extends from a portion of said exposed interior surface to said front surface of said cover plate.

* * * * *